April 13, 1965  A. L. JOHNSON  3,177,638
WIDE SWATH MOWER CONVERTIBLE FOR HIGHWAY TRAVEL
Filed Sept. 30, 1960  9 Sheets-Sheet 2

April 13, 1965  A. L. JOHNSON  3,177,638
WIDE SWATH MOWER CONVERTIBLE FOR HIGHWAY TRAVEL
Filed Sept. 30, 1960  9 Sheets-Sheet 6

United States Patent Office 3,177,638
Patented Apr. 13, 1965

3,177,638
WIDE SWATH MOWER CONVERTIBLE FOR HIGHWAY TRAVEL
Arthur L. Johnson, 111 W. Washington, Delavan, Wis.
Filed Sept. 30, 1960, Ser. No. 59,635
8 Claims. (Cl. 56—7)

This invention relates to a self-propelled wide swath mower which may be moved from place to place at high speed on a highway without interfering with normal flow of traffic.

The principal object of the invention is to provide a self-propelled wide swath mower which may be used for contract mowing work of large areas such as airports, which is particularly adapted to do the necessary mowing along the margins and medians of superhighways, and which may be rapidly converted for high speed highway travel.

Another object of the invention is to provide a self-propelled mower which has mower heads mounted on its two sides, and a front mower head which is wide enough to overlap the swaths cut by the two side mower heads, and in which the side mower heads are movable between laterally extended mowing positions and folded traveling positions substantially parallel to the longitudinal axis of the chassis.

A further object of the invention is to provide a self-propelled mower which is mounted on a very short coupled chassis, the chassis being provided with a four-wheel steering mechanism so that the chassis may execute a 180° turn with the mower head at one side of the machine constantly extending into the area which has just been mowed.

Still a further object of the invention is to provide a self-propelled mower having three mower heads each of which may be controlled from an operator's post on the mower chassis, so that the operator of the mower may independently provide for forward or reverse driving of each mower head, may change the vertical position of the front mower head, may change the vertical position and angle of incline of the side mower heads, and may move the side mower heads to any position between a normal mowing position and a traveling position, all through control means which is readily accessible from the operator's post. The mower may cut any swath from 6 feet to 17 feet by suitable positioning of the two side mower heads.

Still a further object of the invention is to provide a self-propelled mower in which either of the mower heads at the two sides of the chassis may be extended horizontally from the chassis or may be inclined at any angle between 45° above the horizontal and 45° below the horizontal for mowing embankments, sides of ditches, and the like.

The device of the present invention provides a mowing machine of extraordinary versatility which can be used for fine lawn mowing, or which may mow rough grass or heavy weeds at mowing speeds up to 10 or 15 miles an hour, and which may be operated at normal highway speeds in moving from one mowing job to another. Specifically, when the mower has its side mower heads folded for travel the entire unit is no wider than the maximum vehicle width permitted on limited access highways, and the vehicle is capable of road speeds comfortably in excess of the minimum speeds required for limited access highways.

The invention is illustrated in a preferred embodiment in the accompanying drawings in which.

Figure 1:
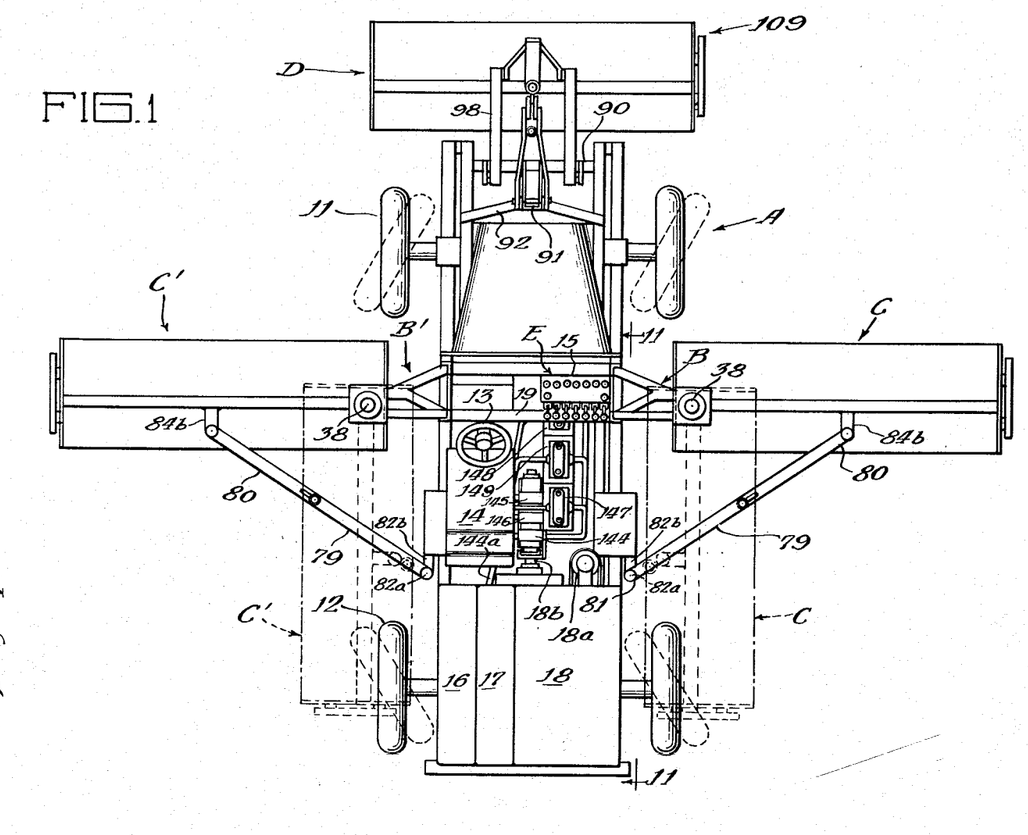
FIG. 1 is a plan view of a mower constructed in accordance with the invention, the side mower heads being illustrated in full lines in mowing position and in broken lines in folded, traveling position, and the chassis wheels being illustrated in full lines as positioned for forward travel and in broken lines as positioned for turning the mower in the sharpest possible radius.
Figure 12:
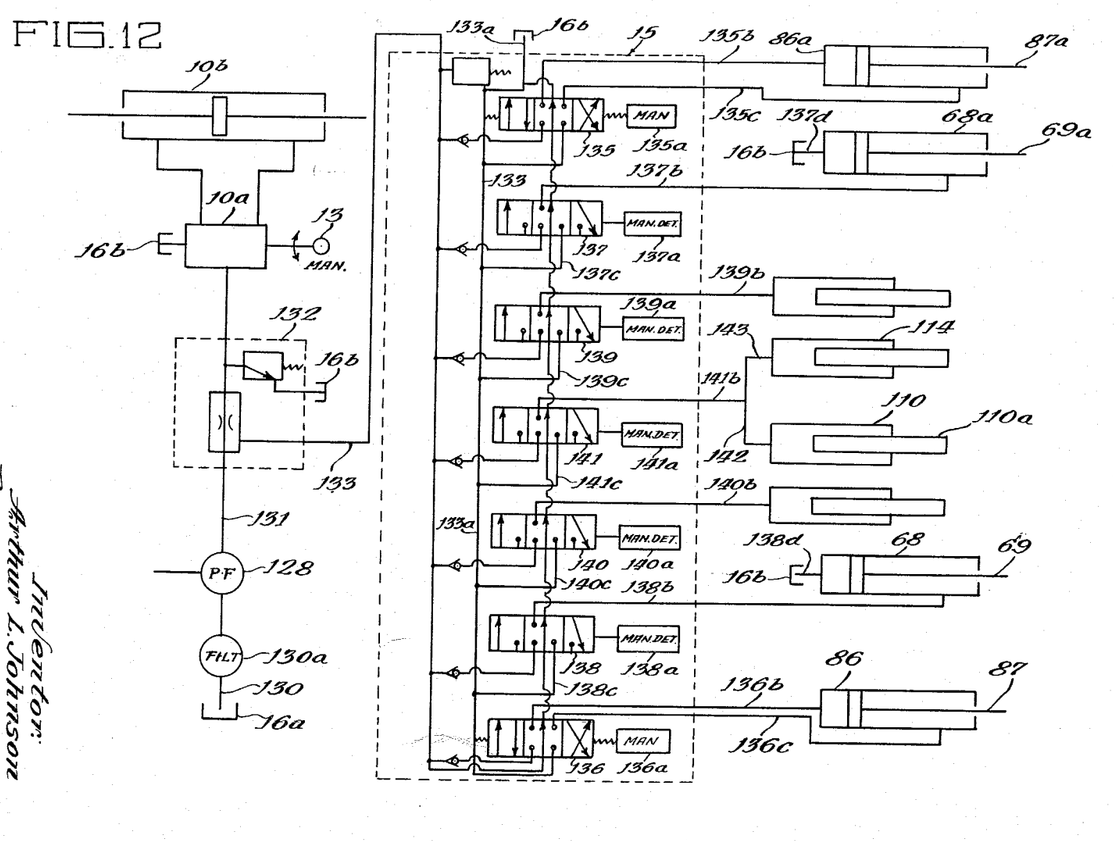
FIG. 12 is a diagram of the hydraulic circuit for the mower head positioning controls and power steering.

Referring to the drawings in greater detail and referring first to FIG. 1, the present invention consists generally of a four-wheel self-propelled chassis, indicated generally at A, right and left side mower head supporting and positioning assemblies, indicated generally at B and B1, respectively, which support and control, respectively, the position of a hydraulically driven right mower head, indicated generally at C, and a left mower head, indicated generally at C1; a front mower head assembly including supporting and positioning means and a hydraulically driven mower head, indicated generally at D; and a hydraulic system E for driving and controlling the positions of the three mower heads (illustrated diagrammatically in FIG. 12).

The chassis A is a four-wheel drive chassis, having a very short wheel base. The chassis has drive means including a motor A1, supplied with a power take-off affording required hydraulic power drives for the mower head positioning cylinders and for a power assisted chassis steering means, indicated generally at 10 in the hydraulic control circuit diagram FIG. 12. The chassis steering means 10 provides four-wheel steering which turns chassis front wheels 11 and rear wheels 12 co-ordinately upon movement of the steering wheel 13, so as to give the chassis an extremely short turning radius. The specific four-wheel steering mechanism forms no part of the present invention; but it may be stated generally that a conversion from two wheel steering is accomplished by using front and rear wheel assemblies which are the same as those employed for the front wheels of the four-wheel drive FC-170 Willys truck, and by linking the front steering mechanism to the rear wheels by a suitable linkage. Four-wheel steering mechanisms are very well known, and the present invention merely utilizes a suitable conversion of the Willys truck to four-wheel steering.

In the usual position behind the steering wheel 13 is an operator's post or seat; and as seen in FIG. 1 a valve bank 15 for the hydraulic control system E is mounted on the chassis dashboard where it is readily accessible from the operator's seat, or operator's post of the machine. Directly behind the seat 14 is an oil tank 16 for the fluid of hydraulic system E; while a fuel tank 17 provides fuel both for the chassis engine (not shown) and for a 124 horsepower auxiliary internal combustion engine 18 which is used solely to drive the mower heads C and D. An air cleaner 18a for auxiliary motor 18 is seen in FIG. 1 to be positioned in front of the motor casing alongside the rear of the driver's seat.

Figures 2, 3:
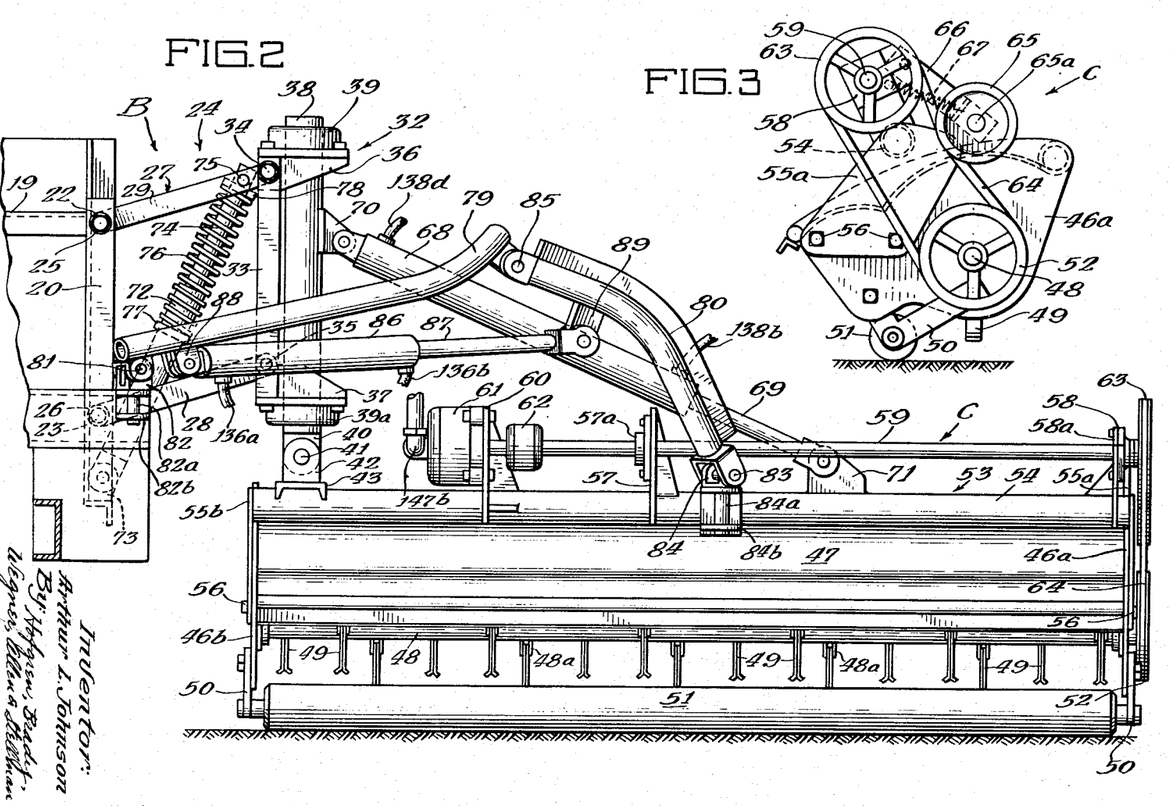
FIG. 2 is a fragmentary vertical sectional view on an enlarged scale, illustrating the mounting of one of the side mower heads.
FIG. 3 is an end elevational view, on an enlarged scale, of one of the side mower heads with the supporting mechanism for the mower head omitted for clarity.
Figures 4, 5, 6:
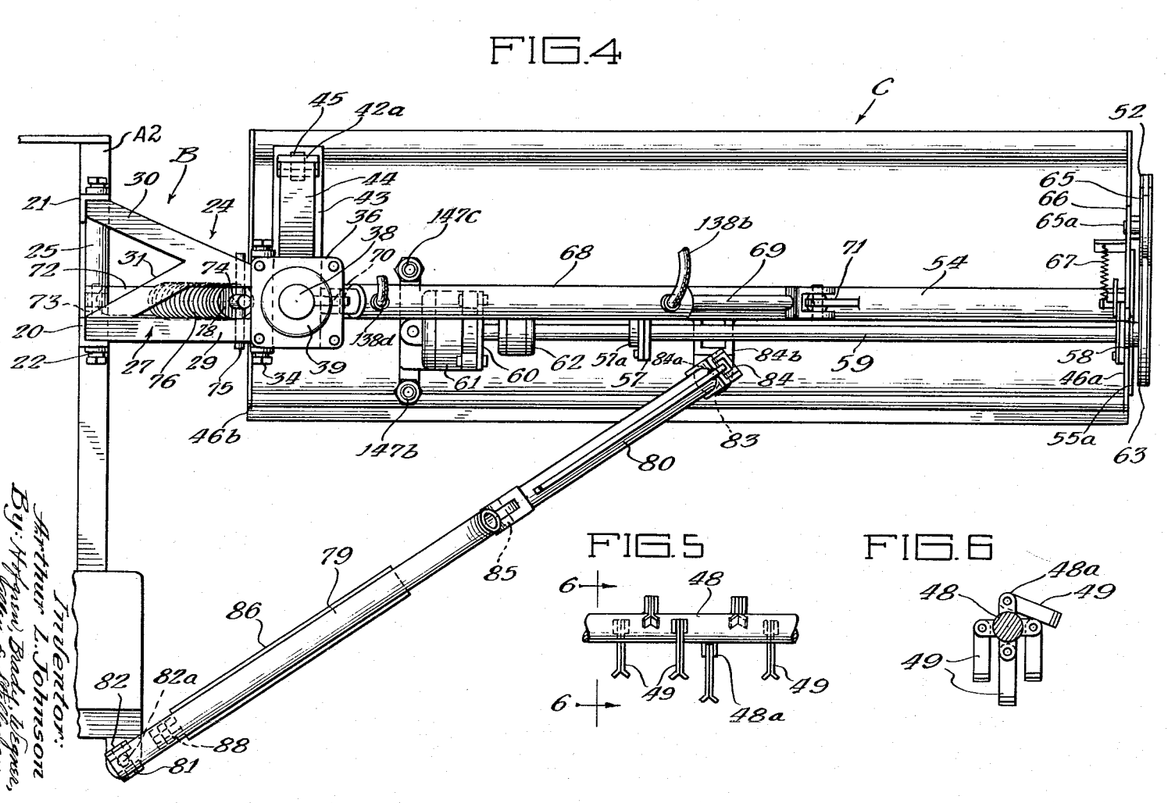
FIG. 4 is a fragmentary plan view, on an enlarged scale, of a side mower head illustrating its attachment to the chassis.
FIG. 5 is a fragmentary front elevational view on an enlarged scale showing the shaft and cutting blades of the mower head.
FIG. 6 is a section taken substantially as illustrated along the line 6—6 of FIG. 5.

As seen in FIG. 1, a cross frame member 19 extends across the chassis A immediately ahead of steering wheel 13 and is supported at the two sides by upright posts 20; and angle members 21 are secured to the sides of the frame substantially at the dashboard. The members 19, 20, and 21 provide a frame for supporting the side mower head adjusting and positioning mechanisms B and B1 on which the side mower heads C and C1 are mounted. FIGS. 2 to 4 illustrate the right mower head C and its supporting and positioning assembly B, and only this side will be described in detail since the mechanisms B1 and C1 are an allochiral duplication of B and C.

Referring to FIGS. 2 and 4, supporting and positioning mechanism B includes upper and lower longitudinal pivot shafts 22 and 23, respectively, which extend between the upright supports 20 and 21, and support a parallel linkage mechanism, indicated generally at 24, which includes upper and lower sleeves 25 and 26, respectively, which are rotatable upon pivot shafts 22 and 23 and carry fixed upper and lower arms 27 and 28. As best seen in FIG. 4, the upper arm 27 has a rear arm member 29 which extends straight out from sleeve 25, a forward arm member 30 which is angled toward the rear arm member, and an angularly disposed cross brace 31. Lower arm 28 has the same structure, so that the parallel linkage is strong and rigid.

Pivotally connecting the free ends of the arms 27 and 28 is a pintle assembly, indicated generally at 32, which includes an upright channel member 33 pivotally connected at 34 and 35 to the upper and lower parallel arms 27 and 28; and at the two ends of channel member 33 are outwardly extending integral brackets 36 and 37 which are apertured to provide bushings for a pintle 38 which has a top bearing member 39 secured to its upper end and resting upon the top surface of bracket 36, and a lower bearing member 39a beneath bracket 37.

The lower portion of pintle 38 is rectangular in cross section as seen at 40, and a stud 41 extends through said lower portion 40 to pivotally receive a hanger yoke 42 of a hanger bracket 43 for the side mower head C. Welded to the forward side of the upper portion of pintle 38 is a supporting strap 44 which extends forwardly and downwardly and is provided at its lower end with a stud 45 to which a forward hanger yoke 42a of hanger bracket 43 is pivotally connected, so that the mower head may swing in a vertical plane about the center provided by the coaxial studs 41 and 45.

The preferred mower head is a standard commercially available reel mower of the hammer mill type which is suspended from a special mounting used in the present device. The mower head is generally of the type disclosed in U.S. Patent 2,590,065. Other wide swath, longitudinal shaft, reel type mower heads are suitable.

As best seen in FIGS. 2 and 3, the preferred mower head has outer and inner end plates 46a and 46b which are connected by suitable longitudinal structural members not shown and covered by a longitudinally extending hood 47. A mower shaft 48 is suitably journalled in end plates 46a and 46b and has a plurality of radially extending bosses 48a (FIG. 5 and 6) on which cutter arms 49 are pivotally mounted. A pair of adjustable arms 50 secured to end plates 46a and 46b support a longitudinal roller 51 which carries some of the weight of the mower head when the mower is in operation. Adjustment of arms 50 changes the height of the cut made by cutter arms 49. Mower shaft 48 is driven through a mower shaft pulley 52 which is keyed on the shaft outside the end plate 46a.

The mower head as first described is a self-contained unit which is carried beneath a suspension frame, indicated generally at 53, which includes a hanger pipe 54 at opposite ends of which are upright support plates 55a and 55b which receive bolts 56 (FIG. 3) that extend through the mower head end plates 46a and 46b.

Surmounting pipe 54 are drive shaft brackets 57 and 58 provided, respectively, with ball bearings 57a and 58a to receive a drive shaft 59. A motor bracket 60 surmounting the pipe carries a hydraulic motor 61 which is connected to drive shaft 59 through a conventional flexible coupling 62. On the outer end of drive shaft 59, outside bracket 55a is a drive pulley 63, and a drive belt 64 is trained around drive pulley 63 and mower shaft pulley 52. Tension of belt 64 is maintained by a tensioning pulley 65 which is carried on a stub shaft 65a of a pivotally mounted arm 66 and a tension spring 67 extends between arm 66 and drive shaft bracket 58 to draw tensioning pulley 65 against belt 64.

The angular disposition of mower head C with respect to pintle 38 is controlled by a hydraulic cylinder 68 and piston rod 69 which are pivotally connected, respectively, to a pivot boss 70 on pintle 38 and to a pivot boss 71 which surmounts hanger pipe 54. The throw of the hydraulic cylinder 68 is sufficient to position mower head C selectively at any angle from 45° about the horizontal to 45° below the horizontal, with the mower head swinging about the coaxial pivot pins 41 and 45.

Vertical positioning of the mower head with respect to the ground is controlled by movement of parallel linkage 24 about its pivot shafts 22 and 23, and to provide the necessary movement of the parallel linkage a hydraulic cylinder 72 has its lower end pivotally connected to a bracket 73 which is mounted on a chassis side frame member A2 of chassis A, below pivot shaft 23, while a piston rod 74 for the cylinder 72 is pivotally connected at its upper end to a pin 75 which is mounted in upper arm 27 of the parallel linkage. Thus extension of piston rod 74 raises the free end of the parallel linkage to elevate mower head C while retraction of the piston rod lowers the mower head to ride upon the ground. A cushion spring 76 surrounds piston rod 74 and is supported on a spring seat 77 on the cylinder 72 and has a thrust ring 78 at its upper end which abuts pin 75 when the mower head C is in the mowing position of FIG. 2. Thus a substantial part of the weight of the mower head is carried on the cushion spring to prevent excessive load on roller 51.

Figure 11:
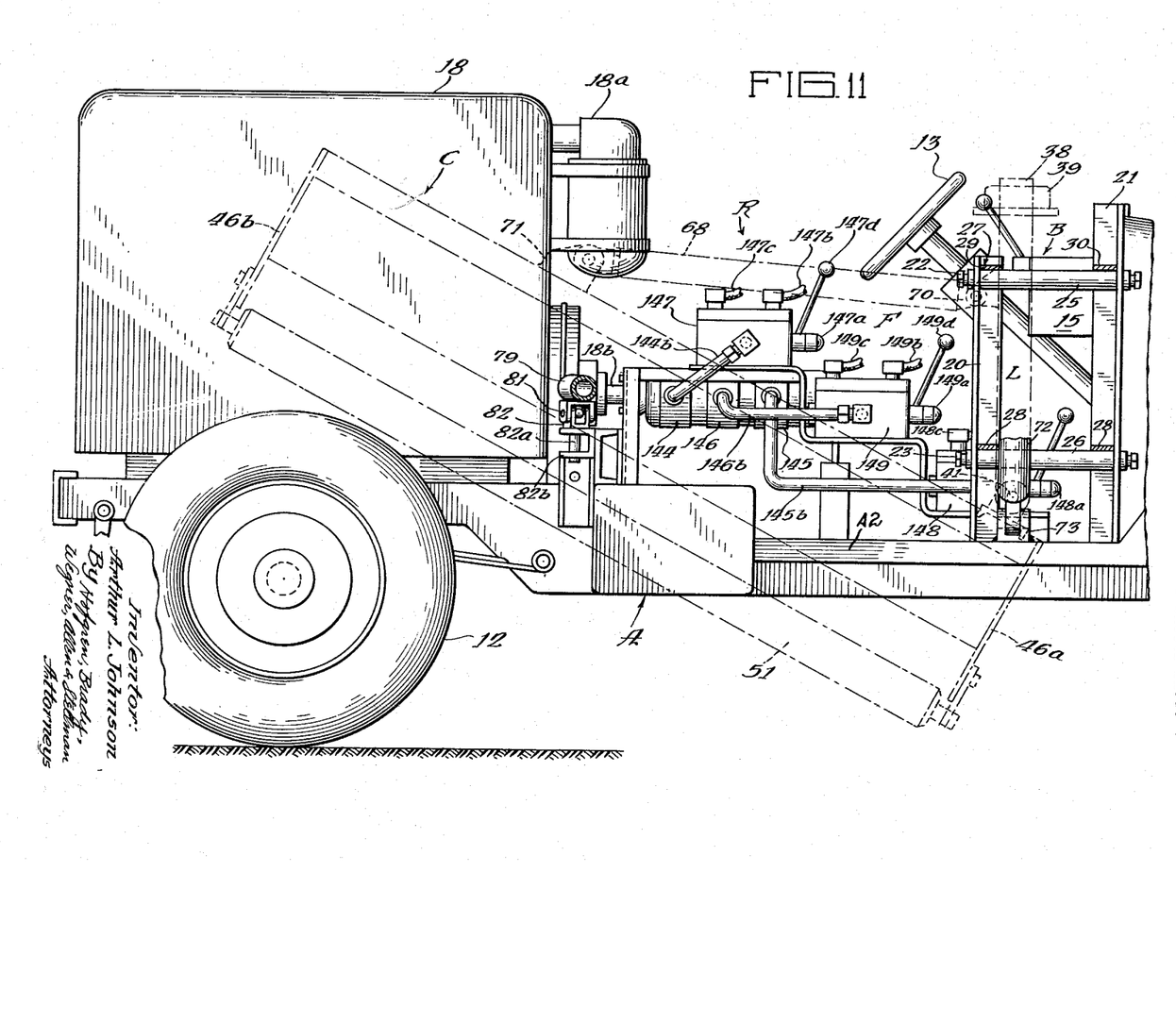
FIG. 11 is a fragmentary section on an enlarged scale taken substantially as illustrated along the line 11—11 of FIG. 1, showing the operator's post with the pumps and control valves for the mower head drive motors, and with the side mower head on the near side of the chassis illustrated schematically in dot-dash lines to show the position occupied by it when it is folded for travel.

Movement of mover head C between the mowing position illustrated in FIGS. 2 and 4 and a retracted traveling position parallel to the center line of the chassis A as seen in broken lines in FIG. 1 is accomplished by a pair of folding links 79 and 80. Link 79 is pivoted at 81 on a pivoting bracket 82, said bracket having an upright base pin 82a carried in a yoke 82b on the chassis frame; link 80 is pivoted at 83 to a bracket 84 having an upright base pin 84a carried in a yoke 84b on hanger pipe 54; and adjacent ends of the two links are pivotally connected to one another at 85. Folding movement of the links 79 and 80 is effected by a hydraulic folding cylinder 86 and piston rod 87 which are pivotally connected, respectively, to a pivot boss 88 near the inner end of arm 79 and a pivot boss 89 which is mounted on folding link 80 close to the pivotal connection 85 between the links. Hydraulic cylinder 86 is a double acting cylinder which is extended to move mower head C to the mowing position of FIGS. 2 and 4, and which is retracted to fold the links 79 and 80 and thus swing the pintle 38 and mower head C to the traveling position of the mower head. As seen in FIG. 11 the mower head must have its free end elevated to clear the rear wheel 12 of the chassis in traveling position, and accordingly when the mower head is retracted the tilting cylinder 68 is also operated to tilt the mower head to the position seen in FIG. 11.

The front mower head positioning assembly and mower head D is supported upon a heavy channel-shaped cross member 90 (see FIGS. 7 to 9) which extends between the chassis side frame members at the extreme front of the chassis, there being a rearwardly inclined main channel member 91 welded to the channel 90 and a pair of inclined brace members 92 which are welded to the upper end of member 91 and to the two chassis side frame members.

A pivot shaft 93 extends through a pair of pivot brackets 91a which are welded to the sides of channel 91, and suspending yoke 94 pivoted on shaft 93 has integral depending arms 95. Surmounting cross channel 90 near the chassis side frame members are laterally spaced upright pivot brackets 96 carrying coaxial pivots 97 for a supporting yoke 98 the outer end portion of which carries a fixed cross rod 99 from which is pivotally suspended a U-shaped forward stiffening yoke 100 and a vertical hydraulic cylinder supporting sleeve 101. A rearwardly extending boss 102 near the upper end of sleeve 101 carries a pin 103 which extends through the lower ends of the integral arms 95 of suspending yoke 94. At the lower end of sleeve 101 is a rectangular portion 101a carrying a longitudinal pivot pin 104 upon which the rear of a front mower head hanger bracket 105 is supported by a bifurcated boss 104a. A bifurcated boss 106 at the front of hanger bracket 105 receives a longitudinal pin 107 which is coaxial with the pin 104 and is carried in the lower end of a supporting strap 108 which has its upper end welded to sleeve 101 immediately opposite bracket 102, and which is also welded to stiffening yoke 100. Welded beneath hanger bracket 105 is a suspension frame identical with that for the side mower head C; said frame including a hanger pipe 105a and upright support plates 105b between which is bolted a mower head 109 which is identical with the side mower heads C and C1.

Loosely seated in sleeve 101 is a hydraulic cylinder 110 having an upwardly extending piston rod 110a. Lateral stability of mower head 109 in travel position is provided by a pair of cables 11 the lower ends of which are looped into eyes 112 on the hanger pipe 105a; and the upper ends of which are looped into a cross bracket 13 on the upper end of piston rod 110a of cylinder 110.

Figure 7:
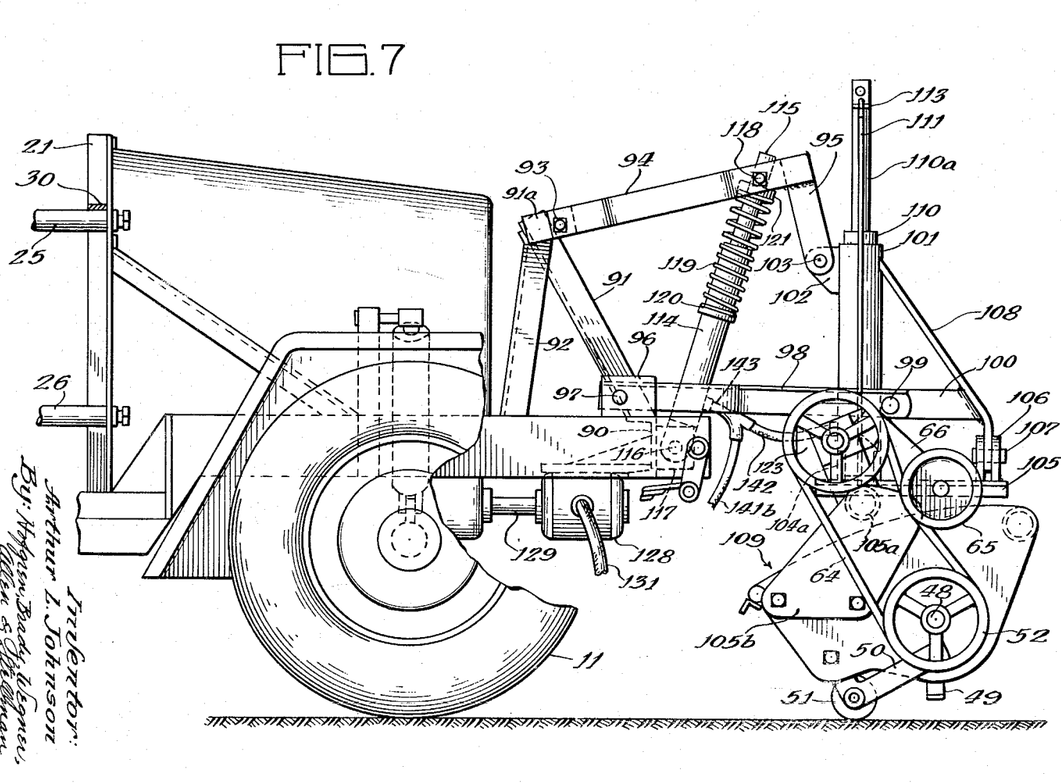
FIG. 7 is a fragmentary side elevational view of the chassis, with parts broken away, to show the mounting of the front mower head, the mower head being illustrated in mowing position.
Figure 8:
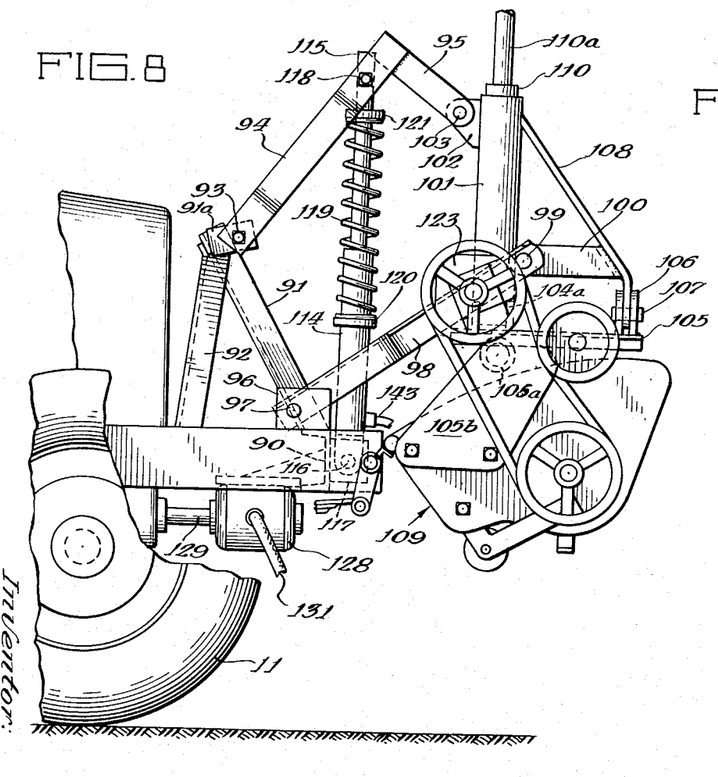
FIG. 8 is a fragmentary side elevational view, with parts broken away, showing the front mower head elevated for travel.

Vertical movement of mower head 109 between the mowing position of FIG. 7 and the traveling position of FIG. 8 is provided by simultaneous action of cylinder 101 and a hydraulic cylinder 114 and piston 115. The lower end of cylinder 114 is pivotally carried on a pin 116 mounted in a bifurcated bracket 117 at the front of cross channel 90, while piston rod 115 is pivotally connected to a pin 118 which extends across the forward portion of yoke 94. When piston rod 115 is retracted as seen in FIG. 7 the mower head 109 occupies its mowing position, while extension of piston 115 swings the carrying yoke 94 and lower support yoke 98 to the position of FIG. 8 for travel of the mower from place to place. A cushion spring 119 supported on a seat 120 on cylinder 114 has a thrust ring 121 at its upper end which abuts pin 118 to support part of the weight of the mower head 109 in mowing position.

Figure 9:
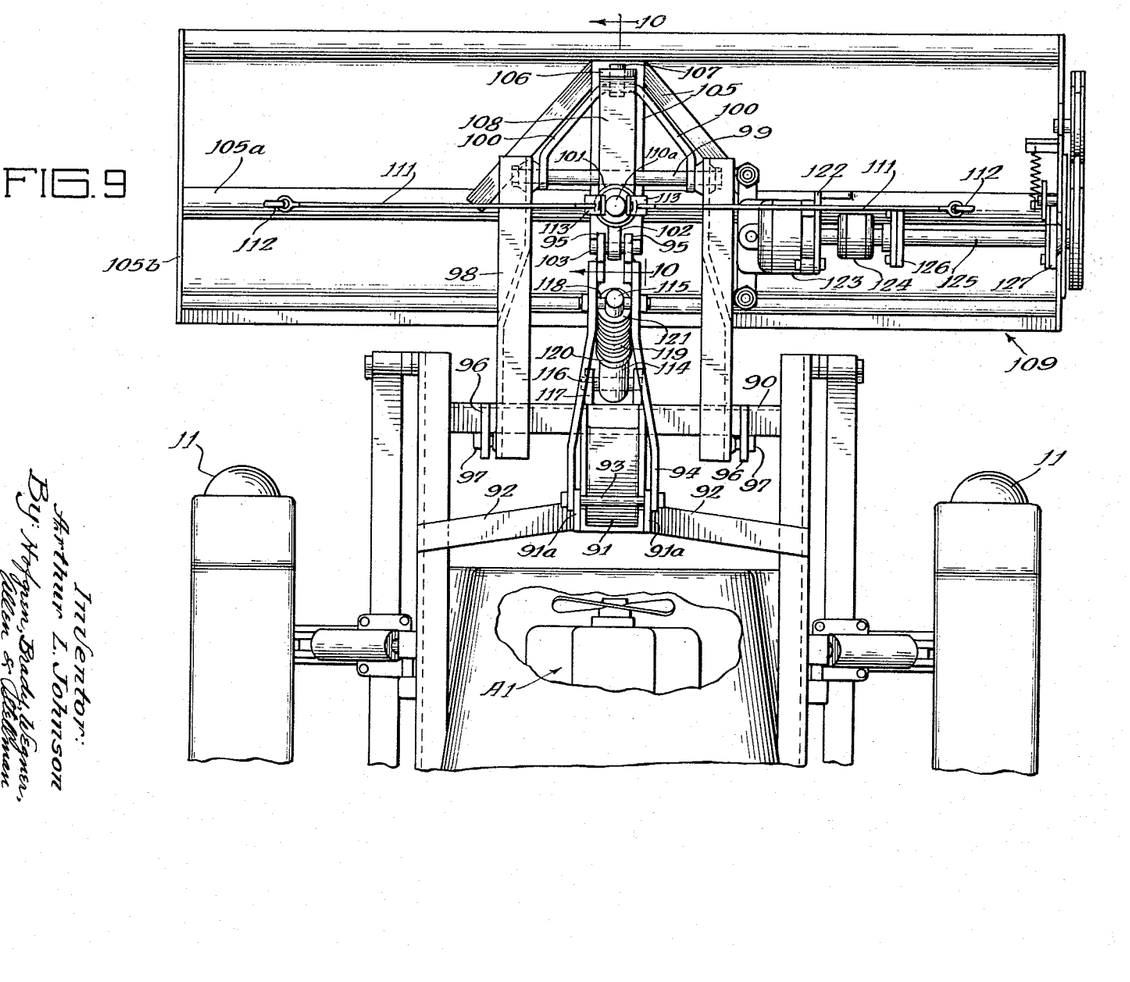
FIG. 9 is a fragmentary plan view of the front of the chassis and the front mower head, with parts broken away.
Figure 10:
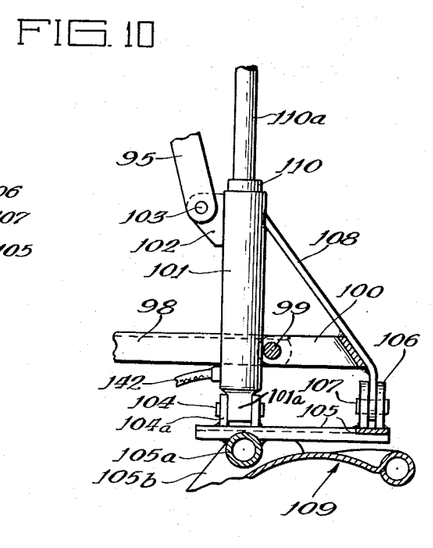
FIG. 10 is a fragmentary section on an enlarged scale taken substantially as illustrated along the line 10—10 of FIG. 9.

The drive for mower head 109 is identical with that for mower head C, except that the motor must be mounted to one side of the center suspension for the mower head. Thus as seen in FIG. 9, a motor bracket 122 at one side of center hanger bracket 105 carries hydraulic motor 123, and the motor is connected through a flexible coupling 124 with a drive shaft 125 which is rotatably supported in bearing brackets 126 and 127. The driving connection between shaft 125 and the shaft of mower 109 is identical with that for mower head C, and thus although the same reference numerals are applied to FIGS. 7, 8, and 9 as appear in FIGS. 2, 3, and 4, the driving connection is not described in detail. Cables 111 are essential to eliminate the unbalanced condition of the mower head when elevated for travel which is created by the off-center location of the motor.

Referring now particularly to FIG. 11, the hydraulic control system E is operated through two separate hydraulic circuits (FIGS. 12 and 13), both of which obtain their hydraulic fluid from the oil tank 16. The position of each of the three mower heads as heretofore described is controlled through a power take-off pump 128 which is seen in FIG. 7 to have a drive shaft 129 extending into the front of the chassis A. Shaft 129 is directly connected to the crank shaft (not shown) for the chassis engine A1 (FIG. 9) at the fan belt pulley assembly (not shown) on the front of the crank shaft, and thus is constantly driven when the engine A1 of the chassis is in operation.

Referring now to FIG. 12, power take-off pump 128 provides the hydraulic power for the power steering means 10 of the chassis, and also provides the hydraulic power for the positioning control of the three mower heads; and for this purpose the hydraulic fluid which is supplied to pump 128 through an infeed 130 and filter 130a from the suction side 16a of the oil tank 16 is pumped through a supply line 131 to a commercially available flow control valve 132, one side of which supplies the power steering 10 while the other side through a valve bank supply conduit 133 supplies the valve bank, indicated generally at 15, for the various mower head positioning cylinders. Valve bank 15 is of a type which has a continuous flow of oil through it, and accordingly there is a valve bank return line 133a to carry oil from the valve bank back to the return side 16b of oil tank 16.

Valve bank 15 has seven manually operated control valves to control the various positioning cylinders for the three mower heads, and includes left and right folding valves 135 and 136 having spring loaded manual control handles 135a and 136a, respectively; left and right tilting valves 137 and 138 having manual control handles 137a and 138a, respectively, having positioning detents; left and right raising valves 139 and 140 having manual control handles 139a and 140a, respectively, having positioning detents; and a front control valve 141 which controls operations of both the cylinders for the front mower head and has a manual control handle 141a provided with a positioning detent.

The right folding valve 136 is connected by an extending line 136b to the rear of right folding cylinder 86, so that when oil is admitted to the line 136b it extends piston rod 87 to move the mower head C to mowing position; while a right folding line 136c is connected to cylinder 86 ahead of the piston to cause retraction of the piston rod and folding of the linkage to move the mower head to travel position. Similarly, left folding valve 135 is connected to a left folding arm cylinder 86a by a suitable extending line 135b and folding line 135c.

Right tilt cylinder valve 138 controls flow of hydraulic fluid to right tilt cylinder 68 which controls the angle of right side mower head C with respect to the horizontal. A conduit 138b to the right tilt cylinder enters the cylinder ahead of the piston, so that when fluid is admitted to the cylinder it elevates the right side mower head C. Since the side mower head C may be lowered by the force of gravity, tilt cylinder 68 is a one-way cylinder. Control handle 138a for valve 138 has three positions—a neutral position, a hold position, and a lift or power position. When the control handle for valve 138 is in the neutral position, the force of gravity on the right side mower head C drains oil from cylinder 68 back through conduit 138b, through valve 138 into a return bore 138c, thence into a spent oil return line 133b in valve bank 15, and through line 133b into the oil tank return side 16b, thus lowering the mower head. When the mower head reaches a desired position, the operator moves the control handle of valve 138 to the hold position, which closes line 138b. To elevate the cylinder the operator moves the control handle 138a for valve 138 to the power position which admits fluid from valve bank supply conduit 133 to line 138b in order to extend the piston rod and elevate the side mower head. Left tilt cylinder 68a similarly has a hydraulic pressure conduit 137b, and return from conduit 137b is through a return bore 137c of tilt valve 137, and also into spent oil return line 133b, so that the control of left tilt cylinder 68a by means of left tilt valve 137 is the same as that for the corresponding cylinder 68 on the right hand side of the mower.

To remove oil which may leak by the piston of cylinder 68 a drain line 138d connects the cylinder behind its piston with the oil tank return side 16b. A similar drain line 137d is connected to left tilt cylinder 68a. The raising cylinders which control position of the parallel linkages at the two sides of the mower are similar to the arrangement just described for the tilt cylinders, but no drain lines are required. Thus, right raising cylinder 72 has a pressure conduit 140b from right raising valve 140, and gravity acting on mower head C may force oil back through conduit 140b, a return bore 140c in the valve bank, and thence through spent oil return line 133b to the return side 16b of the oil tank. The right raising valve 140 is also a three-position valve like the tilt valve 138. The corresponding left raising cylinder 72a has a pressure conduit 139b from raising valve 139, and valve 139 has a return bore 139c communicating with spent oil line 133.

The front cylinders 110 and 114 are connected in parallel to a pressure conduit 141b from front control valve 141, there being a branch 142 from conduit 141b to the cylinder 110 and a branch 143 to the cylinder 114. The valve 141 is identical with valves 137 to 140, and thus has a return bore 141c communicating with spent oil return line 133b to carry oil to the return side of the oil tank.

The power unit of power steering means 10 is of a commercially available type, having a steering valve 10a controlled by steering wheel 13, and a steering cylinder 10b under the control of the steering valve, as seen in FIG. 12. Steering valve 10a is a type which is available from Char-Lynn Company, of Minneapolis, Minnesota, under the trademark "Orbitrol," and is model VSB-1H-A series.

Figure 13:
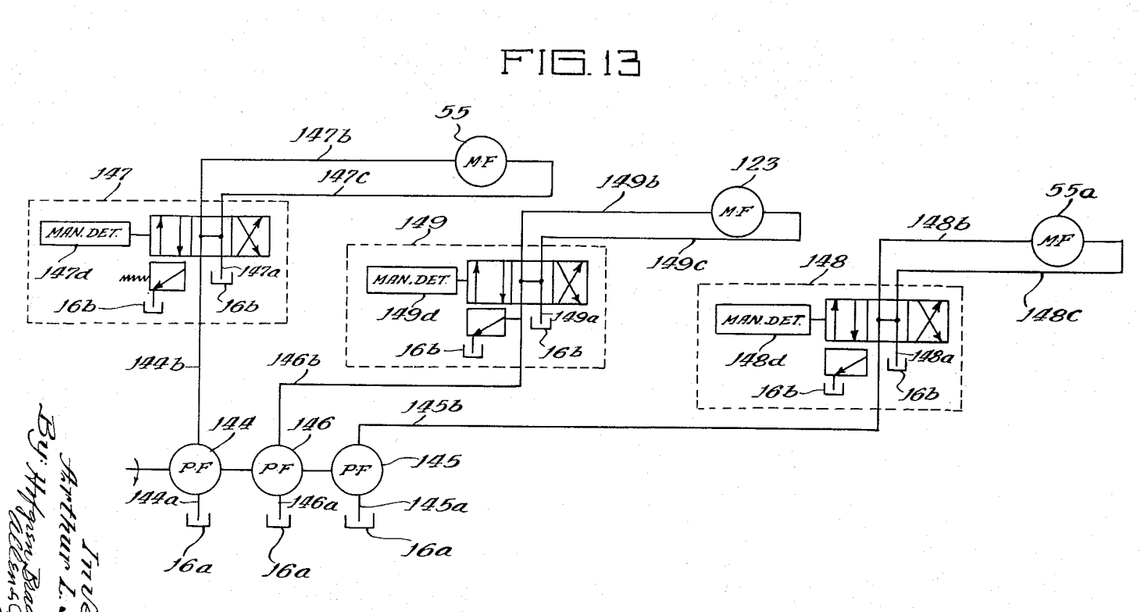
FIG. 13 is a diagram of the hydraulic circuit for the mower head drive.

The drive and drive control for the right mower motor 55, a left mower motor 55a, and the front mower motor 123 is provided by a set of pumps and motor control valves which are seen in FIG. 11 to be positioned on the chassis A alongside the driver's seat. A right motor pump 144, a left motor pump 145, and a front motor pump 146 are seen in FIG. 13 to be connected to suction side 16a of the oil tank by supply conduits 144a, 145a, and 146a, respectively. As seen in FIG. 11, the three pumps are aligned in front of auxiliary motor 18, and are all driven by said motor through a drive shaft 18b. Pressure conduits 144b, 145b, and 146b connect the three pumps, respectively, to a right motor drive valve 147, which is immediately beside the driver's seat, a left motor drive valve 148 which is located under the dash of the chassis, and a front motor drive valve 149 which is between the right and left valves.

Referring now to FIG. 13, each of the drive valves is seen to be of the type through which hydraulic fluid is constantly pumped, and accordingly right drive valve 147 has a return line 147a to the return side 16b of the oil tank, while the left motor valve 148 has a similar return line 148a and the front motor valve 149 has a return line 149a.

Valve 147 is seen in FIGS. 11 and 13 to have a control handle 147d with positioning detents, and the control handle has a neutral position at the center, a forward drive position toward the rear of neutral, and a reverse drive position toward the front of neutral. When valve control handle 147d is moved backward it closes return line 147a and opens a forward drive conduit 147b to right mower motor 55 in order to drive mower shaft 48 in a forward direction. Conversely, when control handle 147 is moved to forward position it positions the valve to pump hydraulic fluid through a reverse line 147c to drive motor 55 and shaft 48 in reverse.

Similarly, left motor valve 148 has a control handle 148d which is movable in the same way as handle 147d, rearwardly to a forward drive position which causes hydraulic fluid to pass through a forward drive conduit 148b into left mover drive motor 55a, or forwardly to cause flow of hydraulic fluid through a reverse drive conduit 148c.

Front motor control valve 149 has a control handle 149d which is movable in the same way as the control handles of the valves 147 and 148, to drive front mower motor 123 forwardly by admitting hydraulic fluid to a conduit 149b or in reverse by admitting hydraulic fluid to a conduit 149c.

It is apparent from FIG. 1 that each of the control valves in valve bank 15 is provided with a suitable valve control handle, and that said handles are conveniently accessible to an operator at the driver's post 14 to control all the necessary movements of the right mower head C, the left mower head C1, and the front mower head 109. Similarly, it is apparent from FIG. 11 that the control valve handles for controlling the drive of the three mower heads, C, C1, and 109 are also readily accessible to an operator at post 14. Accordingly, the entire operation may be readily controlled by a single operator.

It is apparent from the foregoing detailed description that each of the side mower heads is mounted on the chassis for three independent movements:

(a) Translatory movement in a vertical plane by the action of the parallel linkage mechanism 24, operated by hydraulic cylinder 72;

(b) Pivotal movement in a vertical plane about the coaxial studs 41 and 45, under the control of hydraulic cylinder 68; and (c) Swinging movement in a horizontal plane between a laterally extending position perpendicular to the longitudinal axis of chassis A, and a rearwardly extending position parallel to said axis, such motion being about the upright pintle 38 under the control of links 79 and 80, and hydraulic cylinder 86.

Furthermore, each side mower head may be fixed in any desired adjusted position of any of said three independent movements.

The mounting of the side mower heads makes the machine extraordinarily versatile. Thus, for example, it may be operated with all mower heads in their most extended position, as seen in FIG. 1, to provide a swath of 17 feet; or it may be operated with both side mower heads in their folded traveling positions (shown in the broken lines of FIGS. 1 and 11), to mow a six foot swath. It may be operated with the side mower heads, or either of them, in any position between the fully extended position and a position which is almost completely folded. Furthermore, the unit may operate alongside an embankment, mowing at one level on one side and at a different level on the other side; or may mow a level shoulder area of a highway with one side mower head angled downwardly to mow the face of a ditch or upwardly to mow an embankment. Each mower head may be moved to any desired position while the unit is in motion, and without stopping the mowing operation if desired.

Furthermore, the fact that each mower head is operated by a separate hydraulic motor, and that the hydraulic motors are operated by a separate auxiliary internal combustion engine 18, permits the speed of the mower heads to be varied independently of the ground speed of the chassis. This is of great importance in very heavy rough mowing where it may be desirable to operate the chassis at low speed and drive the mower heads at high speed.

The foregoing detailed description has been given for clearness of understanding only, and no unnecessary limitations should be understood therefrom, for some modification will be obvious to those skilled in the art.

I claim:

1. In a mobile mower, in combination, a four wheeled chassis having a longitudinal axis; chassis drive means; an operator's post on the chassis; an upstanding bracket on one side of the chassis; upper and lower parallel arms pivoted on said bracket for movement in a vertical plane which is substantially perpendicular to the longitudinal axis of the chassis; an upright pintle secured to the free ends of said arms and forming a parallel linkage therewith; a pivot bracket on the bottom of said pintle; a horizontal pivot in said pivot bracket; a reel type mower head of substantial length which has its inner end supported on said horizontal pivot; a first hydraulic cylinder and piston means forming an adjustable supporting link between the upper portion of the pintle and an intermediate portion of the mower head, so that adjustment of said cylinder and piston provides a first adjustment by tilting the mower head in a vertical plane about said horizontal pivot; a second hydraulic cylinder and piston means forming an adjustable supporting link between a portion of the upright bracket and a diagonally opposite parallel arm, so that adjustment of said second cylinder and piston provides a second adjustment by rocking the parallel arms on their pivots to produce translatory motion of the mower head in a vertical plane; hydraulically actuated means for turning the upright pintle to provide a third adjustment by swinging the mower head between a position transverse to the longitudinal axis of the chassis and a position parallel thereto; and control means at the operator's post for independently actuating each of said hydraulic means, said control means permitting the positive positioning of the mower head at any desired point within the range of each of said three adjustments.

2. The mower of claim 1 in which the hydraulically actuated means includes a pair of folding links having one end pivoted on the chassis behind the upright bracket and the other end pivoted on the mower head, and hydraulic cylinder and piston means for folding and unfolding said links.

3. The mower of claim 1 which includes a compression spring encircling the piston of the second hydraulic means to resiliently support part of the weight of the mower head.

4. The mower of claim 1 which includes an auxiliary engine on the chassis, a hydraulic pump driven by the auxiliary motor, a hydraulic motor drivingly connected to the mower head and operatively connected to said pump, and means at the operator's post for controlling the operation of said auxiliary motor, said pump, and said hydraulic motor.

5. A wide swath mobile mower comprising: a four-wheeled chassis having a longitudinal axis; chassis drive means; an operator's post on said chassis; a pair of upstanding brackets on opposite sides of the chassis; a set of upper and lower parallel arm pivoted on each of said brackets for movement in a vertical plane which is substantially perpendicular to the longitudinal axis of the chassis; an upright pintle secured to the free ends of both said sets of arms and forming parallel linkages therewith; a pivot bracket on the bottom of each pintle; a horizontal pivot in each pivot bracket; a pair of side reel type mower heads of substantial length, each of said heads having its inner end supported on one of said horizontal pivots; a pair of first independent hydraulic cylinders and piston means forming adjustable supporting links between the upper portion of each pintle and an intermediate portion of each mower head, so that adjustment of each first cylinder and piston provides an independent first adjustment by tilting the associated mower head about its horizontal pivot; a pair of second independent hydraulic cylinder and piston means forming adjustable supporting links between a portion of each upright bracket and the diagonally opposite arm of each of the sets of parallel arms, so that adjustment of each second cylinder and piston provides a second adjustment by rocking the associated parallel arms on their pivots to produce translatory motion of each associated mower head in a vertical plane; a pair of independent hydraulically actuated means for turning each upright pintle to provide a third independent adjustment by swinging the associated mower head between a position transverse to the longitudinal axis of the chassis and a position parallel to said axis; a bracket assembly extending forwardly from the chassis, said bracket assembly being mounted on horizontal pivot means for vertical swinging movement; a front reel type mower head carried on said bracket assembly with its ends overlapping the inner ends of the side mower heads; hydraulic cylinder and piston means for swinging said bracket assembly to move the front mower head between a lowered mowing position and an elevated traveling position; and control means at the operator's post for independently actuating each of said hydraulic means, said control means permitting the positive positioning of each side mower head at any desired point within the range of each of said three adjustments and the positive positioning of the front mower head at any desired point between lowered and elevated positions of the front bracket assembly.

6. The mower of claim 5 which includes an auxiliary engine on the chassis, a hydraulic pump driven by the auxiliary motor; a separate hydraulic motor drivingly connected to each mower head and operatively connected to said pump, and means at the operator's post for independently controlling the operation of the auxiliary motor, the pump, and each of said hydraulic motors.

7. The mower of claim 5 which includes chassis steering means controlled from the operator's post and producing coordinate steering movement of all four wheels of the chassis so that the chassis may execute a U-turn with one side mower head extending constantly into the mowed area.

8. A wide swath mobile mower comprising, in combination: a chassis; four wheels; means steerably mounting each of said wheels to said chassis; chassis drive means; an operator's post on said chassis; chassis steering means controlled from the operator's post and producing coordinate steering movement of all four wheels of the chassis so that the chassis may execute a U-turn in a very short radius; a front mower head supported on the front of said chassis for movement between an elevated traveling position and a lowered mowing position; hydraulic front mower head positioning means on the chassis for moving the front head between said mowing and traveling positions; a pair of side mower heads; means for pivotally mounting each of said side mower heads on opposite sides of the chassis for movement between a travelling position parallel to the chassis and a mowing position extending laterally from the chassis, the span of each side mower head in mowing position overlapping the span of the front mower head, and the length of each side mower head being greater than the turning radius of the chassis, whereby an end portion of a side mower head remains constantly in the cut grass as the mower executes a U-turn; hydraulic positioning means for swinging the side mower heads independently between mowing and travelling positions; and control means at the operator's post for independently activating said front mower head positioning means and said side mower head positioning means.

(References on following page)

References Cited by the Examiner

UNITED STATES PATENTS

| | | | |
|---|---|---|---|
| 2,104,719 | 1/38 | Pol et al. | 56—7 |
| 2,621,462 | 12/52 | Morse | 56—25 |
| 2,653,437 | 9/53 | Crump | 56—7 |
| 2,666,491 | 1/54 | Johnson | 280—91 XR |
| 2,672,000 | 3/54 | Speiser | 56—7 |
| 2,732,675 | 1/56 | Smith et al. | 56—6 |
| 2,828,598 | 4/58 | Anderson et al. | 56—25 |
| 2,909,882 | 10/59 | Lewis | 56—7 |
| 2,936,561 | 5/60 | Grimes | 56—7 |
| 2,958,175 | 11/60 | Sprinkle | 56—25.4 |
| 2,974,469 | 3/61 | Smith et al. | 56—25.4 |
| 2,987,865 | 6/61 | Sherman | 56—25.4 |

T. GRAHAM CRAVER, *Primary Examiner.*

CARL W. ROBINSON, *Examiner.*